United States Patent [19]

Uchiyama et al.

[11] Patent Number: 5,617,130

[45] Date of Patent: Apr. 1, 1997

[54] IMAGE SMOOTHING METHOD AND APPARATUS

[75] Inventors: Yasufumi Uchiyama; Masaru Kawarazaki; Jun-ichi Shirai, all of Tokyo, Japan

[73] Assignee: Kyocera Corporation, Kyoto, Japan

[21] Appl. No.: 170,681

[22] Filed: Dec. 20, 1993

Related U.S. Application Data

[63] Continuation of Ser. No. 779,923, Oct. 21, 1991, abandoned.

[30] Foreign Application Priority Data

Jul. 11, 1991 [JP] Japan .................................. 3-196118

[51] Int. Cl.⁶ .................. B41J 2/47; H04N 1/21; H04N 1/23; G06F 17/00
[52] U.S. Cl. .................. 347/131; 347/240; 347/251; 358/459; 358/298; 395/110
[58] Field of Search .................. 347/251, 254, 347/240, 131, 183, 184, 15; 358/298, 458, 459, 462; 395/110, 142, 143, 150

[56] References Cited

U.S. PATENT DOCUMENTS

| | | | |
|---|---|---|---|
| 3,573,789 | 4/1971 | Sharp et al. | 347/254 |
| 4,321,610 | 3/1982 | Moore et al. | 347/132 |
| 4,635,081 | 1/1987 | Wiedemer | 347/132 |
| 4,679,057 | 7/1987 | Hamada | 347/252 |
| 4,780,730 | 10/1988 | Dodge et al. | 347/244 |
| 4,809,021 | 2/1989 | Check et al. | 347/251 |
| 4,835,549 | 5/1989 | Samejima et al. | 347/237 |
| 4,847,641 | 7/1989 | Tung | 347/131 |
| 4,933,689 | 6/1990 | Yoknis | 347/131 |

FOREIGN PATENT DOCUMENTS

| | | |
|---|---|---|
| 60-139072 | 7/1985 | Japan . |
| 60-251761 | 12/1985 | Japan . |

*Primary Examiner*—Benjamin R. Fuller
*Assistant Examiner*—David Yockey
*Attorney, Agent, or Firm*—Loeb & Loeb LLP

[57] ABSTRACT

An image smoothing apparatus which forms dot images on a matrix array and smooths images of curvatures or diagonals included in the dot images. The apparatus includes a shifting unit which shifts a specific pixel to generate first smoothing video data, thereby selecting a divided video data for defining a time interval and timing of the specific pixel, and a masking unit which subjects divided video data to a Boolean conjunction operation with a mask pattern to generate second smoothing video data. Smoothed video data for the specific pixel is formed by selecting suitable operations from among the shifting and masking according to the arrangement of reference pixels adjoining to the specific pixel.

8 Claims, 14 Drawing Sheets

|  | 1ST BANK | 2ND BANK | 3RD BANK | 4TH BANK | 5TH BANK | 6TH BANK | 7TH BANK | 8TH BANK |
|---|---|---|---|---|---|---|---|---|
| 1ST ADDRESS | D11 | D21 | D31 | D41 | D51 | D61 | D71 | D81 |
| 2ND ADDRESS | D12 | D22 | D32 | D42 | D52 | D62 | D72 | D82 |
| 3RD ADDRESS | D13 | D23 | D33 | D43 | D53 | D63 | D73 | D83 |
| 4TH ADDRESS | D14 | D24 | D34 | D44 | D54 | D64 | D74 | D84 |
| 5TH ADDRESS | D15 | D25 | D35 | D45 | D55 | D65 | D75 | D85 |

IMAGE SMOOTHING METHOD AND APPARATUS

This is a continuation of application Ser. No. 07/779,923 filed on Oct. 21, 1991, now abandoned.

BACKGROUND OF THE INVENTION

1. Field of the Invention

The present invention relates to an image smoothing apparatus for printers, such as laser printers, light emitting diode (LED) printers or the like, which form dot images in a matrix array, and more particularly to an apparatus for smoothing images of curves or diagonals included in the dot images to obtain high quality images.

2. Description of the Prior Art

The prior art discloses a laser printer for forming a picture element or "pixel" pattern on a photosensitive drum along a coaxial scanning line in a matrix by repeatedly scanning laser beams with modulated video data sent serially from an image controller.

In another prior art technique, a dot printer (such as an LED printer or a thermal printer) forms pixel patterns in a matrix array on a recording member or on a photosensitive drum (which moves in a direction relatively vertical to the scanning line) by forming pixels arrayed in a line along the scanning line, and by being controlled to emit the full line simultaneously or successively, block by block.

In either printer, the pixels are arrayed in an n×m matrix to form characters or pictures. Letters consisting of curves or diagonals, such as "0" or "V", are formed with stairstep edges or boldfaced crossings having a plurality of pixels close to each other, as in the letter "X". This damages the quality of the picture.

To overcome defects in laser printers which form pixel patterns by scanning modulated laser beams along the scanning line, attempts at smoothing the stairsteps have been disclosed in which a smaller dot size is formed by reducing the output energy for the pixels at the diagonal edges (Japanese Laid Open Pat. Appln. 60-139072). Another technique narrowly modulates the width of the output beam pulse (the video clock) and prints the small dots within the standard dot area.

In the prior art techniques described above, however, it is difficult to treat for smoothing those stairsteps which correspond to the variational states of curves or diagonals, because such techniques are limited to modifying the pixel diameter, shifting the small pixels within the range of the video clock for the standard pixel.

A third prior art technique, therefore, as shown in Japanese Laid Open Pat. Appln. 60-251761, discloses a smoothing method of replacing a white dot with a smaller black dot, or with a coarse energy density pixel next to the specific pixel in the scanning or horizontal direction. This technique provides a method for simply adding a smaller dot next to a specific pixel. It does not improve the image quality of thin curved lines or diagonal lines, because it makes the thin line boldfaced. Nor does it offer an effective smoothing method for a slightly tilting line, because it simply adds a dot horizontally.

A technical means to remedy the defects above is provided in U.S. Pat. No. 4,847,641, wherein a small dot is not only added adjacent to the specific pixel, it is also formed by flattening a standard dot so that the addition of the small dot and the flattening of the standard pixel according to the small dot are subjected coordinately in the directions of the horizontal scanning line and of the vertical subscanning line too.

The method of the fourth prior art technique, as shown in FIG. 10, may be described as comprising: providing four compensation subcells $51a, \ldots, 51d$ for producing dots narrower in the scanning direction, and four other compensation subcells $52a, \ldots, 52d$ for producing dots narrower in the subscanning direction, serially loading bit data corresponding to image information in a first-in-first-out (FIFO) buffer 53, subsequently receiving the data in a plurality of line unit, extracting the bit data adjacent the specific bit out of a sampling window 54; transferring the bit data to a matching network 55; matching the bit data map in the window 54 with a plurality of templates 56 provided in the matching network 55; selecting, if matched, suitable compensation subcells with a subcell generator 57 for producing the dot(s) among the subcells $51b, 51c, 52c, 52d$, and/or compensation subcells for adding the small dot(s) to the adjacent white pixel(s) among the subcells $51a, 51d, 52a, 52b$; selecting, if not matched, the standard pixel to output serially the selected video data to a print engine driver 58 enabling the laser printer to operate as desired.

With the fourth prior art technique, therefore, a tilted vertical line, as shown in FIG. 9(a), is modified to produce a standard pixel 70 that is narrower in the horizontal direction along the scanning line, and to add a small dot next to the narrowed standard pixel opposite to the narrowed portion, as if the specific pixel had shifted horizontally. A horizontally inclined line, as shown in FIG. 9(B), is modified to produce a standard pixel 70 that is narrower in the vertical direction to the scanning line, and to add a small dot 71 in the rest space as if the specific pixel had shifted vertically. Thus, the fourth technique provides a desirable smoothing treatment to remedy the defects of the prior art previously stated.

The fourth prior art technique, however, still raises two issues.

The first issue lies in the configuration of the image elements. As stated above, the technique comprises a method of producing a narrower dot with a small dot added aside, as if the dot image was seemingly shifted to compensate for the stairstep. As shown in FIG. 9(A), the configuration of the image elements is formed with a constricted part 73 which may reveal a defect, particularly when the dot image is enlarged. This technique does not always form a closer approximation of the original analog continuous form.

Though the technique, further, tried to produce narrower subcells in both the vertical direction and the horizontal direction in coordination, it is difficult to make the dot narrower in both the vertical direction and the horizontal direction in coordination with an actual electrophotographic printer.

With a laser printer, for example, it is easy to make the dot narrower horizontally by means of beam modulation, which is based on the modification of the basic pulse width of video data. It is, however, difficult to make the dot narrower vertically, even if the beam energy intensity is reduced, and may result in merely reducing the diameter of the latent dot on a photosensitive drum.

On the other hand, in an LED printer it is easy to make a dot narrower vertically by means of controlling the time for emitting the LED array. It is more difficult, on the other hand, to modify the dot horizontally, because the LED elements are disposed at a fixed distance block after block.

The second issue of this prior art technique is the constitution of the electronic circuit.

To match the unique bit map of the sampling window with a number of pattern matching templates, the equipment must be provided with the standard pattern templates in a combination of each four sheets of templates for the dots adjacent to the central dot horizontally or vertically, and for the two dots of subcells which have to be selected for the adjacent dot. The number of templates, therefore, must be at least 256 (256=(4 sheets for horizontal dots×4 sheets for vertical dots)$^2$). Further, if the equipment is provided with a number of application templates for easier and more uniform smoothing treatment, the number of templates swells to an even greater extent. The large number of templates increases the volume of the memory and makes the comparing logic circuits very complicated, resulting in longer operation time which can not cope with the requirement for faster operation.

The prior art technique has revealed the second issue above, because the technique selects the subcells of two dots simultaneously for two axes, namely horizontal and vertical adjacent dots.

Further, the technique generates the sampling windows shifting consecutively the central dot piecewise, which results in matching for every dot in a multiple manner, which is apt to prolong the matching operation time.

SUMMARY OF THE INVENTION

Taking the above disadvantages of the prior art into consideration, it is an object of the present invention to provide an image output processing apparatus for a dot printer wherein the smoothing process can be achieved easily and accurately without making the circuits complicated, with a simple modification operation.

It is another object of the present invention to provide an image output processing apparatus for a dot printer wherein the enhanced dot image together with the smoothing process enable enlargement of the processed dot image.

The present invention functions independently of preceding and succeeding operations, as reflected in the independent claims.

An embodiment of the present invention will be described in a concrete way in comparison with the fourth prior art technique.

In general, the most preferable method of smoothing a steep vertical slanted line, as previously described in the prior art technique, is to physically shift the dots 61A to the right or to the left in order to properly align with the dots 61B, as shown in FIG. 8(a).

However, the prior art technique has used a smoothing processing circuit that is generally applicable for every form of slanted or curved line. Consequently, while the technique has basically been aimed at shifting the dots, the prior art technique can not physically shift the dots for steep vertical lines. Instead, the technique of dot replacement (including addition) with the compensation subcells is used to make the standard pixel narrower horizontally, and the technique of disposing the horizontally flattened subcell at the horizontal space next to the narrowed standard pixel is also used. As a result, the standard pixel seemingly shifts along the scanning line. These techniques produce the disadvantages that have been described above.

Further, the simulated horizontal shifting operation can hardly achieve smooth line edges. Therefore, the prior art technique of dot replacement (including addition) with the compensation subcells is used to make the standard pixel narrower vertically, as well as disposing the vertically flattened subcell at the vertical space next to the narrowed standard pixel. As previously described, it is difficult to use these techniques to form a vertically narrower dot using a laser printer.

Consider the developing mechanism of the latent image exposed with a pulse laser beam PI on a photosensitive drum, as shown in FIG. 8(C). The top portion 61 of the hill shaped beam intensity distribution 60, of which static electric potential on the surface of the drum exceeds a threshold potential level, is rendered or realized as a latent image. Most of the remaining area 60a at the foot of the distribution 60 is left as the noise potential. If a small beam dot P2 having a lower intensity distribution 62 is irradiated at the foot of the noise area 60a, then a latent image 63 is rendered closer to the top portion 61 and the distribution 62 is heaped over the original distribution 60.

The same mechanism may be seen, as shown in FIG. 8(D), where the images 61 are formed in a letter "L" or a stairstep. An unexpected image 64 is apt to be realized at the recessed corner of the stairstep, wherein one potential distribution of the images is heaped over another potential distribution of the images.

Therefore, upon irradiating beam dots on white dots or blank spaces adjoining black dots which form stairsteps (of which irradiation time of video data is shorter than that of the standard video data to form small dots), the small images are rendered much closer to the adjoining standard dots located above, below or diagonally to the small images. The smoothing of stairsteps can thereby be achieved without vertically irradiating a specially arranged flattened beam dot, as in the prior art technique. The irradiation time need not necessarily be kept constant, but may be modulated selectively (e.g., 20% or 40% of the time for the standard dot) according to the degree to which the lines are slanted.

It is more preferable to avoid a partially bold-faced line for better smoothing processing, wherein the time for the standard dot is also modulated to obtain a slightly smaller dot 65 corresponding to the small image in a variety (e.g., of 60% or 80% of the time for the standard dot), controlling the output pulse width for the black dot or the basic pulse numbers of divided video data wherein the basic pulse number is counted by a pulse generated with a basic oscillator of the apparatus.

To realize the former processing for shifting the standard pixel, as shown in FIG. 8(a), it is enough to provide a means for shifting the output timing of video data or the divided video data which define the output timing and location of the standard pixel corresponding to the inclination degree of slanted or curved lines. The shift distance may either be kept constant, or be variably set, if necessary.

On the other hand, to realize the latter processing for modifying the pixel size, as shown in FIG. 8(b), one has to solve two issues: first, providing the white dot or blank space with the small dot, which size is modulated by output pulses as much as desired, e.g., 20% or 40% for the standard dot size; second, reducing the output pulses of the black dot as much as desired, e.g., 80% or 60% for the standard dot size.

If the latter processing is provided with two independent means for each of these two issues, then the hardware and software becomes complicated and the processing time is prolonged. These problems, however, can be solved by using a Boolean conjunction operation (AND operation) with a mask pattern.

The conjunction operation for a black dot, as shown in FIG. 7(a), is executed on divided digitized video data corresponding to a 100% black dot with a digitized mask pattern for 80% or 60%, thereby generating 80% or 60% video data and eliminating part of the original divided video data. In contrast, the conjunction operation for a white dot (which consists of a series of "0", as shown in FIG. 7(b)), is executed with a digitized mask pattern for 20% or 40%, thereby generating 20% or 40% video data.

Thus, the conjunction operation for the divided video data with the mask pattern simultaneously solves the problems mentioned above.

Therefore, the present invention, in its preferred embodiment, comprises at least two means, one for shifting and another for Boolean conjunction operation, which are selected according to the arrangement of the specific pixel with the adjoining reference pixels to generate smoothed video data for the specific pixel, whereby the objects and effects of the present invention can be suitably achieved without a complicated circuit constitution, with the most appropriate smoothing features.

The two means may be selected according to the inclination degree of the slanted or curved line it is likely that the shifting means is selected for the lines exceeding the inclination of 45 degrees, whereas the conjunction means is selected for the lines not exceeding 45 degrees. The two means are not always selected for every line. That is, dividing the reference field into three categories according to the inclination, less than 30 degrees, 30 to 60 degrees, and exceeding 60 degrees, the conjunction means is selected for the lines within the field less than 30 degrees, no. means is selected for the lines within the field of inclination of 30 to 60 degrees of which video data are passed without smoothing processing, and the shifting means is selected for the lines within the field exceeding the inclination of 60 degrees.

Because the present invention includes the shifting means which shift the divided video data or a sum of pulses generated by a video clock, the shifted video data corresponding to the specific pixel invades the area for the adjoining pixel, wherein the invasion has to be rectified to form the smoothed output video data for the print engine.

In the preferred embodiment of the present invention, a pair of registers is provided, wherein the area of each register is equivalent to a center bit area with the side extension areas. The center bit area corresponds to the pulse numbers of divided the video data identical to the basic pulse numbers of video clock. The side extension areas correspond at least to the basic pulse numbers for the shifting distance, at both ends of the center bit area. The smoothed video data processed by the smoothing circuit are loaded one after the other in the registers, whereby the Boolean disjunction operation is executed for the video data adjoining each other during the transmission from the registers one after the other to form the video data transmittable to the print engine.

Thus, with the present invention, the extended parts due to the shifting to the adjoining pixel area are overlapped with each other, allowing the forming of continuous video data transmittable serially.

The technique is not necessarily limited to the present invention, but is applicable in a technical field including the smoothing circuit having the shifting means to shift the output timing of the original video data for the standard pixel.

In the present invention, therefore, the smoothing procedure is executed for a specific pixel successively one by one, whereas in the prior art technique, the procedure handles simultaneously at least two adjoining pixels to seemingly shift the specific pixel. Therefore, the present invention allows a simple constitution for hardware and software, eliminating the complicated circuit, preventing the prolonged processing and malfunction.

In the present invention, without forcing the smoothing processing with single means as in the prior art technique, a plurality of means is provided which is selected according to the pixel arrangement to adopt the most suitable means for the smoothing processing, resulting in offering the accurate and easy smoothing processing with the simple decision operation.

Further in the present invention, means for shifting the video data, for modification of basic pulse numbers, and for generating of the video data are adopted, wherein the smoothing processing means is suitable for so called single axis timing. Thus, the video data is applicable with a traditional technique for both the laser printers of which beam can be modulated horizontally along the main scanning line, or the LED printer of which beam can be modulated vertically along the subscanning line, offering effects of great utility.

BRIEF DESCRIPTION OF THE DRAWINGS

FIGS. 5A through 5D are circuit diagram for component units of the mask signal generator, in which FIG. 5A illustrates a divided video data (VDATA) generator, FIG. 5B illustrates a mask pattern generator, FIG. 5C illustrates a masking unit, and FIG. 5D illustrates a shift unit.

FIGS. 8A–8B show the principle of an embodiment of the present invention, in which FIGS. 8A–8B show the pixel arrangements.

DETAILED DESCRIPTION OF THE PREFERRED EMBODIMENT

A preferred embodiment of the present invention will be described with reference to the accompanying drawings. The sizes, materials, shapes, and relative arrangement of respective parts of the embodiment described herein are only descriptive examples and are not intended to restrict the scope of the present invention, unless otherwise noted.

Figure 1:
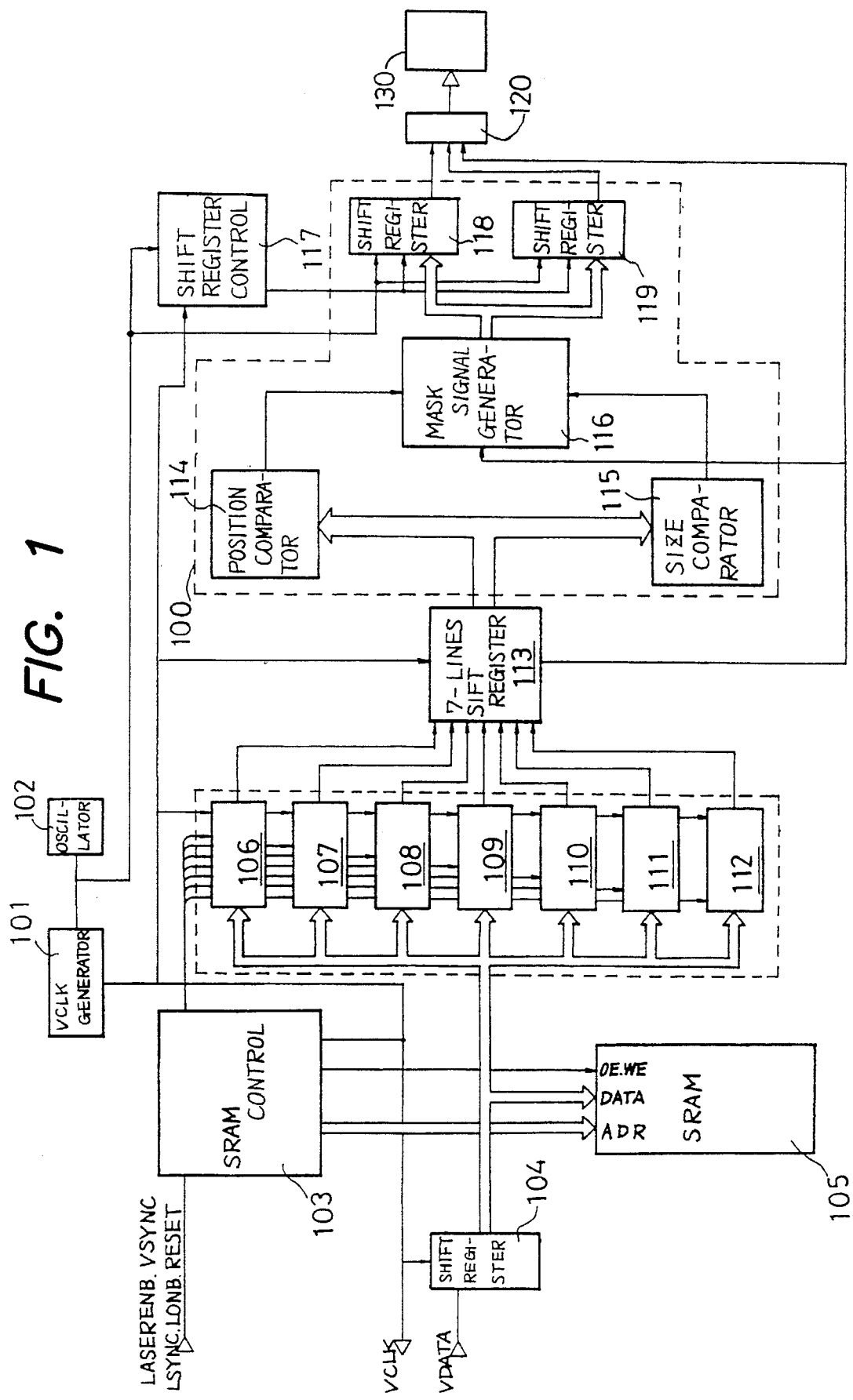
FIG. 1 block diagram showing the whole smoothing process circuit according to the present invention.
Figure 6A:
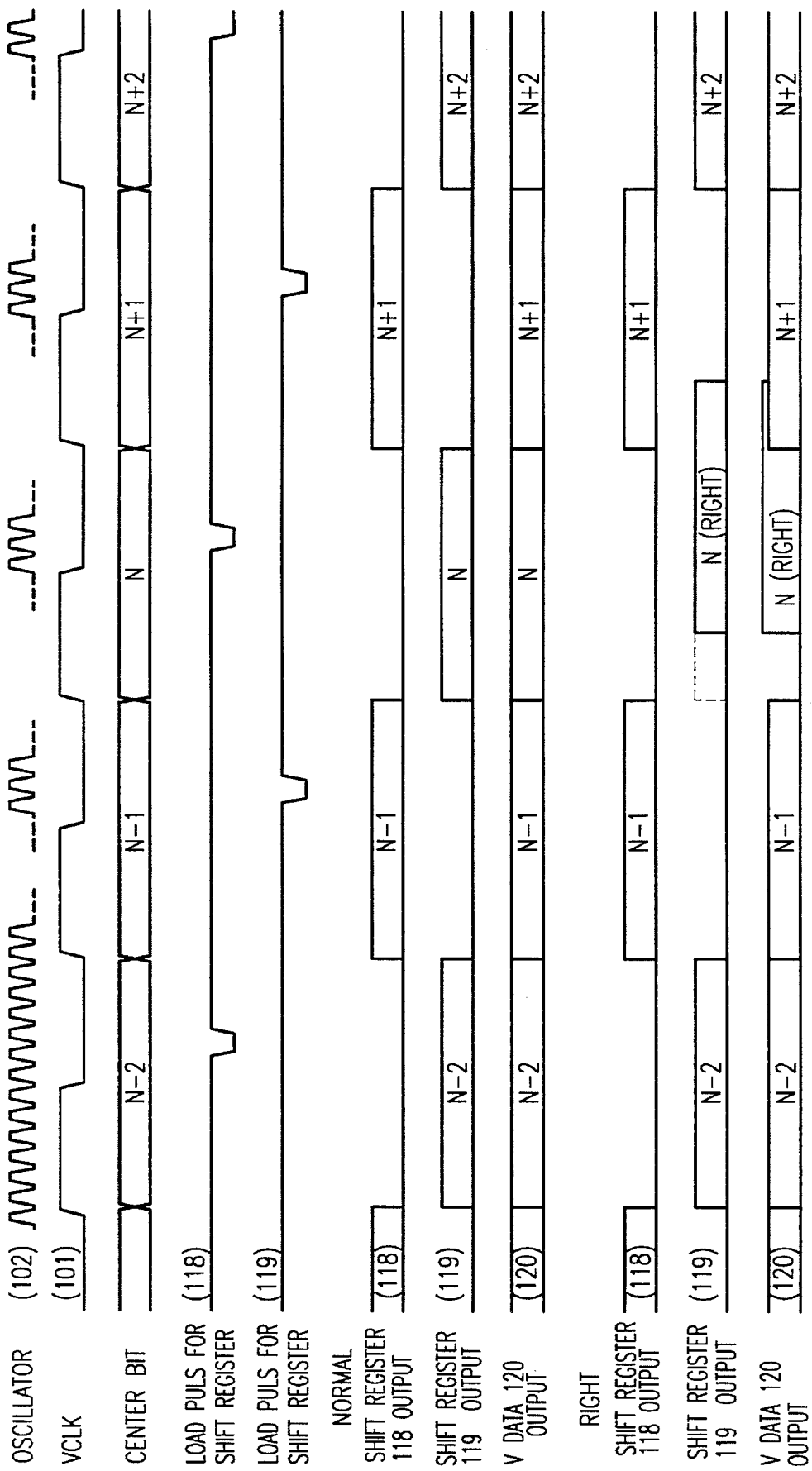
FIG. 6A is a timing chart showing the processing steps of the mask signal generator.
Figure 6B:
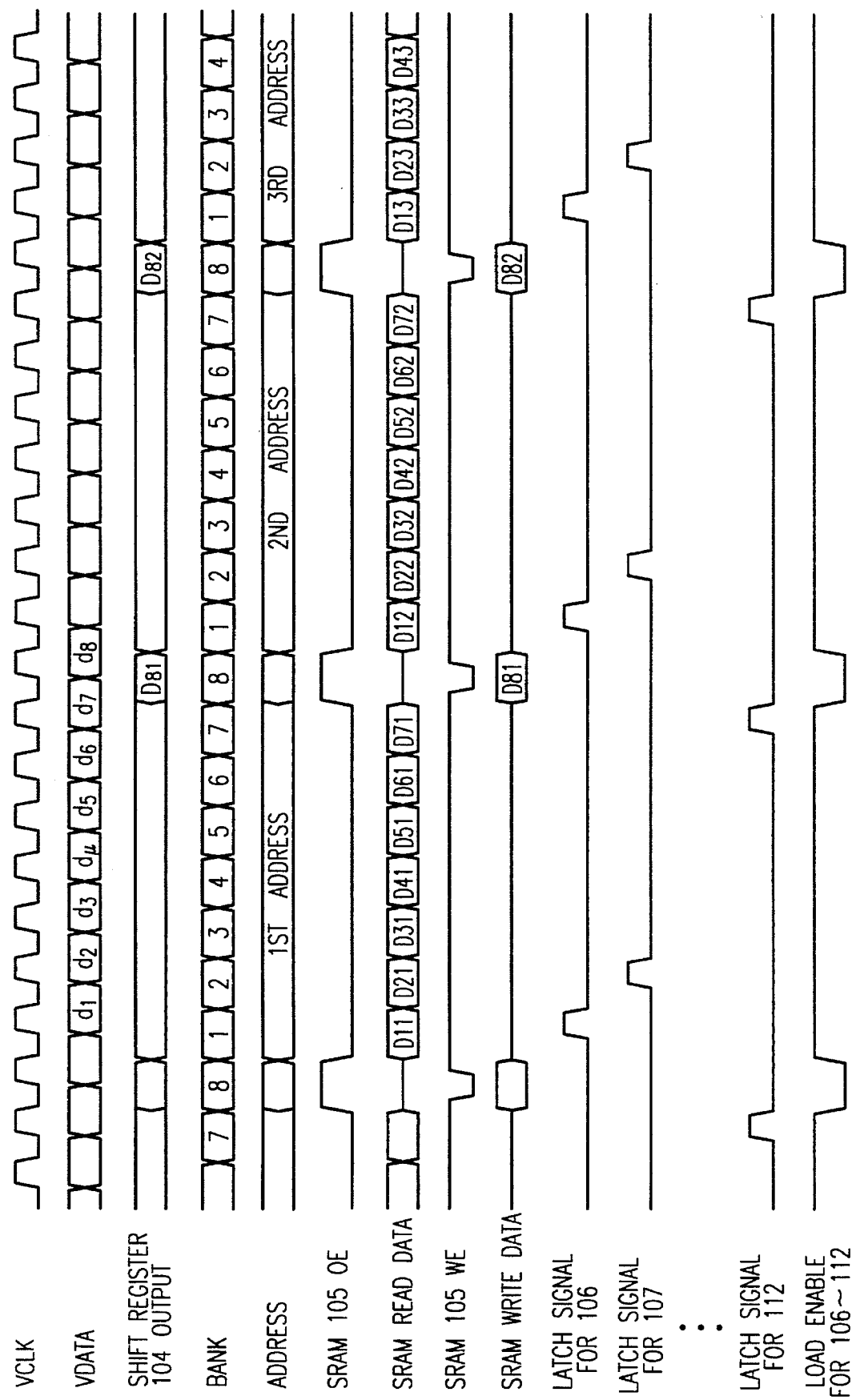
FIG. 6B is a timing chart showing the loading steps of original video data into the SRAM.

FIG. 1 is a block diagram showing the whole smoothing process circuit according to the present invention, of which detailed constitution will be described following the steps as shown in FIG. 6B of the timing chart.

Figures 3, 4:
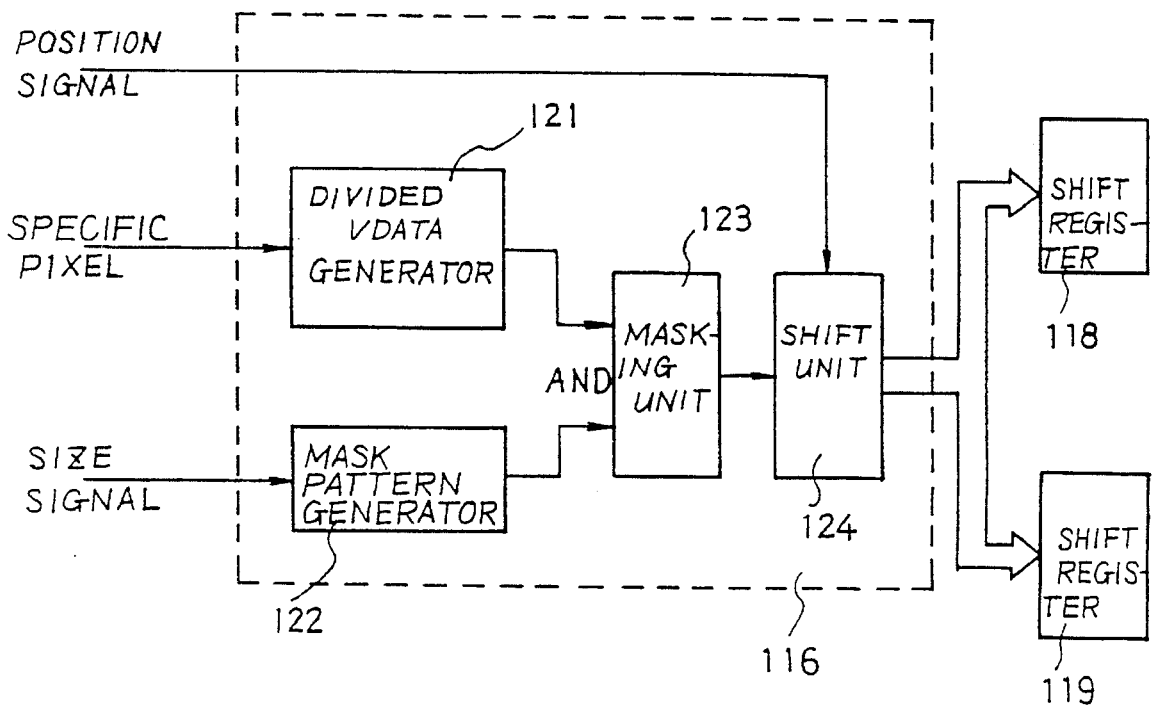
FIG. 3 is an internal structure chart showing the loaded state of the original video data in SRAM.
FIG. 4 is a block diagram showing the detailed constitution of mask signal generator shown in FIG. 1.

A serial video data developed in an image RAM (not shown) is transferred serially to a shift register 104 synchronizing with a video clock (VCLX) generated with a VCLK generator 101. The video data is converted into an 8 bits parallel data in the shift register 104 to be loaded into the first address of the first bank of a static RAM (SRAM) 105 as shown in FIG. 3. The next 8 bits parallel data is loaded into the second address, and the third 8 bits parallel data is loaded into the third address. Thus, the following video data (VDATA) for a scanning line are repeatedly loaded until the first bank of the SRAM 105 is filled out with the VDATA of the first line.

The same steps are successively repeated to load the VDATA for the second line into the second bank, the VDATA for the third line into the third bank, and so forth.

Once VDATA for seven lines are stored in the first bank through seventh bank of the SRAM 105, an SRAM control 103 reads out the VDATA stored in the first addresses of the first bank through seventh bank, during an interval of time for preparation of video data to be loaded in the first address of the eighth bank. Then, the VDATA are transferred respectively into latches 106 through 112 following the latch signals. As soon as the SRAM control 103 stores converted parallel data in the first address of the eighth bank, the SRAM control 103 transfers the data stored in the latches 106 through 112 into a 7-line shift register 113.

The same steps are repeated, during the interval of time for loading the VDATA for the eighth line into the eighth bank of the SRAM 105, to transfer successively the VDATA for the first to seven lines stored in the SRAM 105 into the 7-line shift register 113 through the intermediation of the latches 106 to 112.

When the complete VDATA for the eighth line are stored in the eighth bank of the SRAM 105, the VDATA for ninth line are stored in the first bank, the VDATA for tenth line are stored in the second bank. The same steps are repeated following the control signals generated with the SRAM control 103 until the first to eighth banks are replaced with new VDATA.

Thus, the VDATA are successively transferred from the SRAM 105 into the 7-lines shift register 113 replacing with new ones to form a bit map (7×7). The bit map is arranged in a matrix consisting of a specific pixel or center bit in center with three lines before and behind and with three dots right and left, whereby the smoothing process is made possible with smoothing processing unit 100 described later in detail.

The smoothing processing unit 100 includes two comparators, a position comparator 114 and a size comparator 115, a mask signal generator 116, and a pair of shift registers (20 basic pulses) 118 and 119. The comparators generate control signals referring the arrangement in the bit map, for shifting or masking a divided video data corresponding to the original VDATA for the specific pixel. The mask signal generator 116 generates smoothed VDATA according to the control signals of comparators 114 and 115. The pair of shift registers 118 and 119 store the smoothed VDATA.

In the embodiment of the present invention, the width of the divided VDATA, the length of shifting the VDATA, and the size of the register or like are counted with a basic pulse as a unit which is generated with an oscillator 102.

Figure 8A:
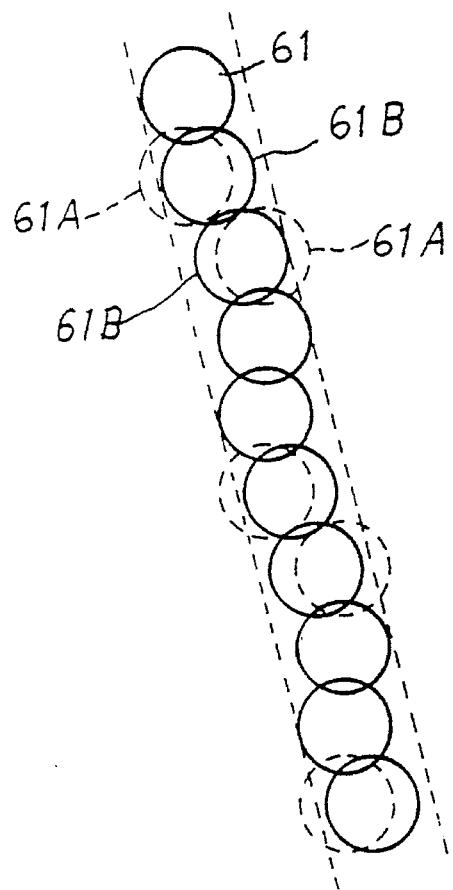

The position comparator 114 is so constructed to make comparisons between the bit map having the center bit for the specific pixel with sample patterns (not shown) stored in the comparator 114. The comparisons are made on the conditions that the pixel arrangement in the bit map with the specific pixel at the center exceeds basically the inclination of 45 degrees, to generate a signal to shift the specific video data right or left, or not to shift, as shown in FIG. 8(A), and to transfer the shift signal to the mask signal generator 116.

Figure 8B:
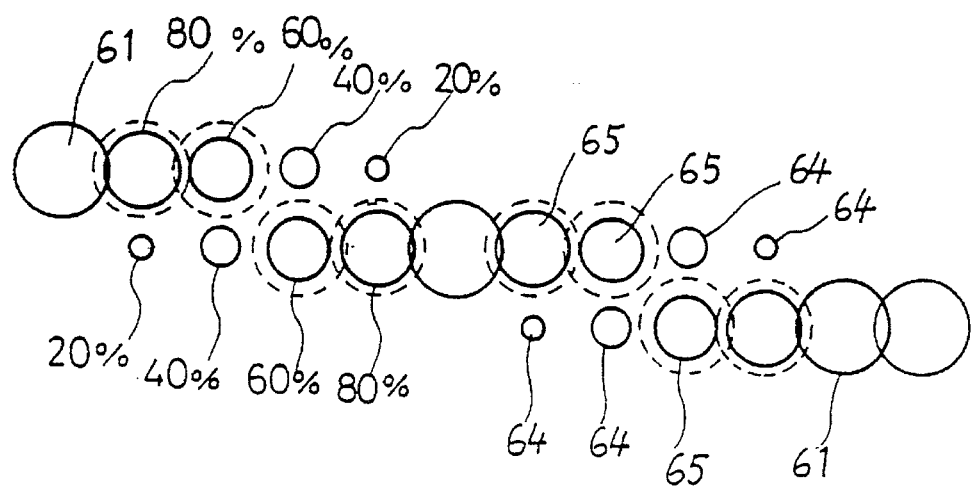
Figure 8C:
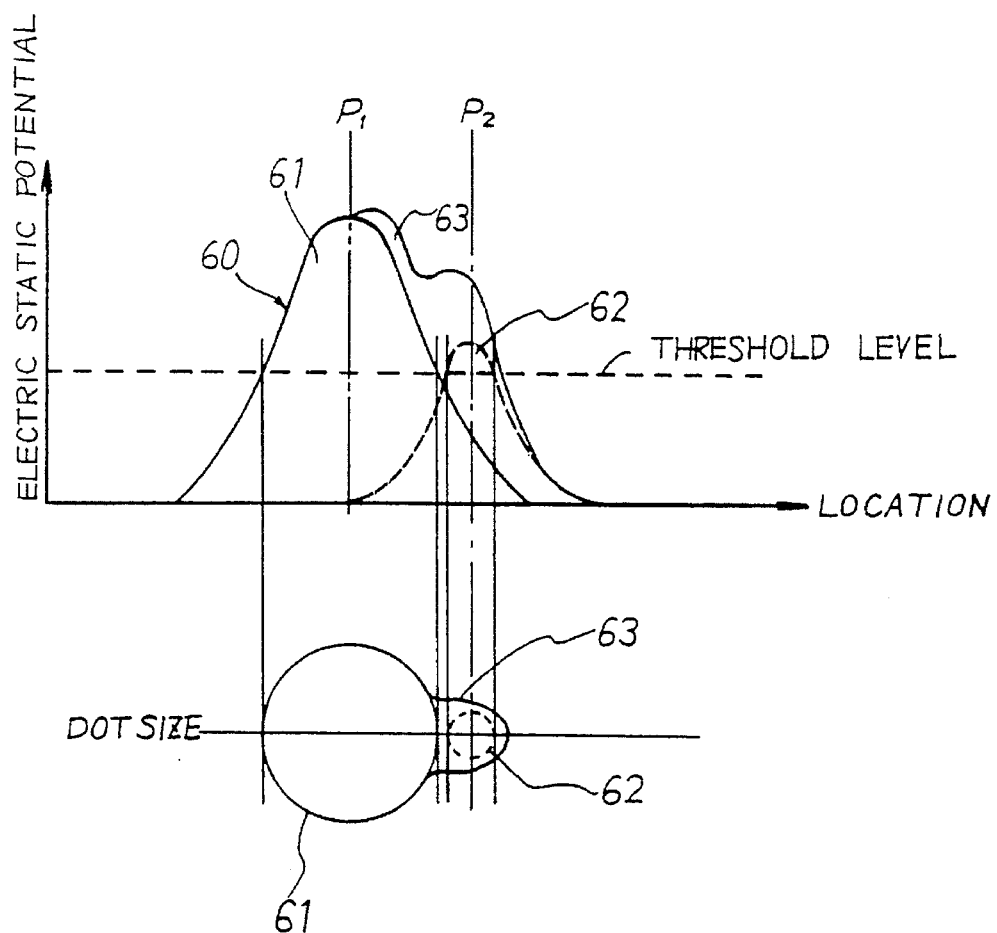
FIG. 8C–8D show the formation and location of latent images of the pixels.
Figure 8D:
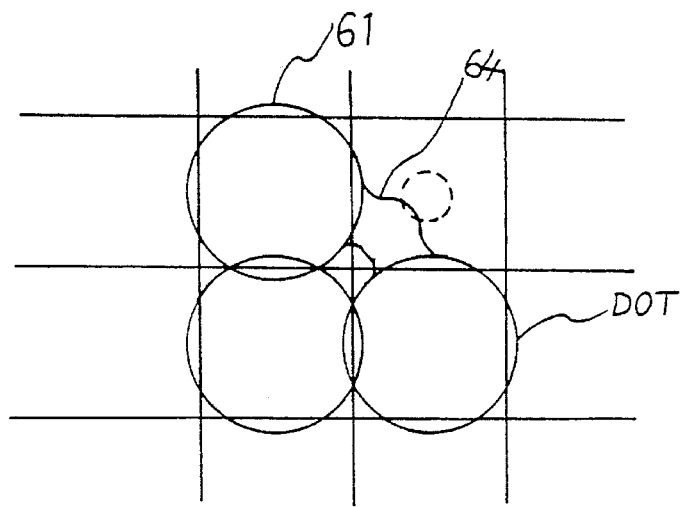
Figure 9A:
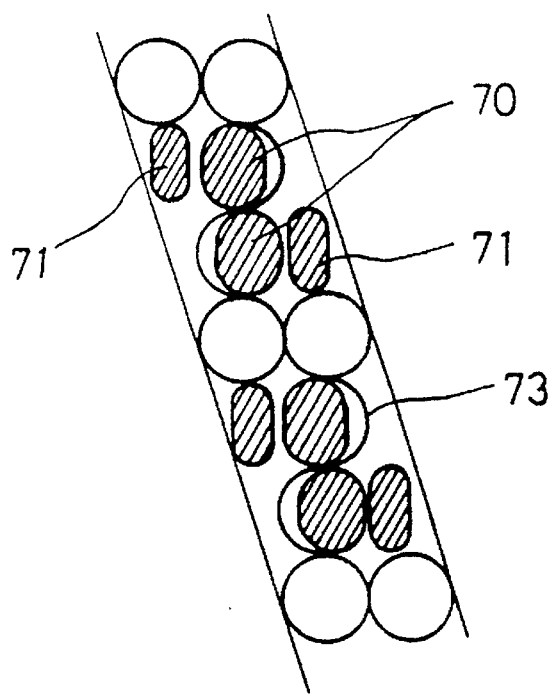
FIG. 9A–9B show the pixel arrangement for smoothing in the prior art technique shown in FIG. 10.
Figure 9B:
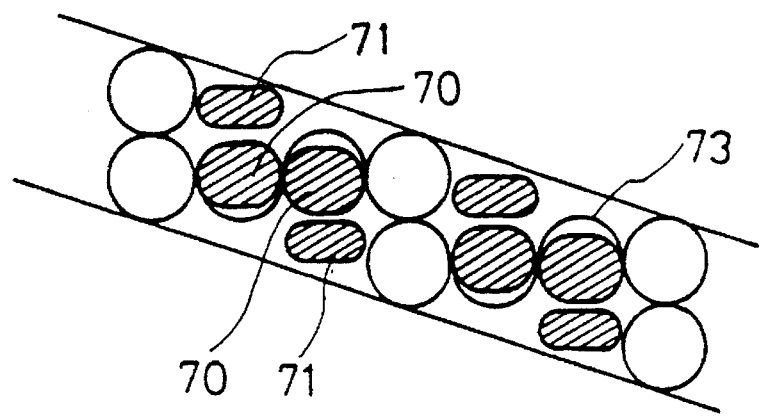
Figure 10:
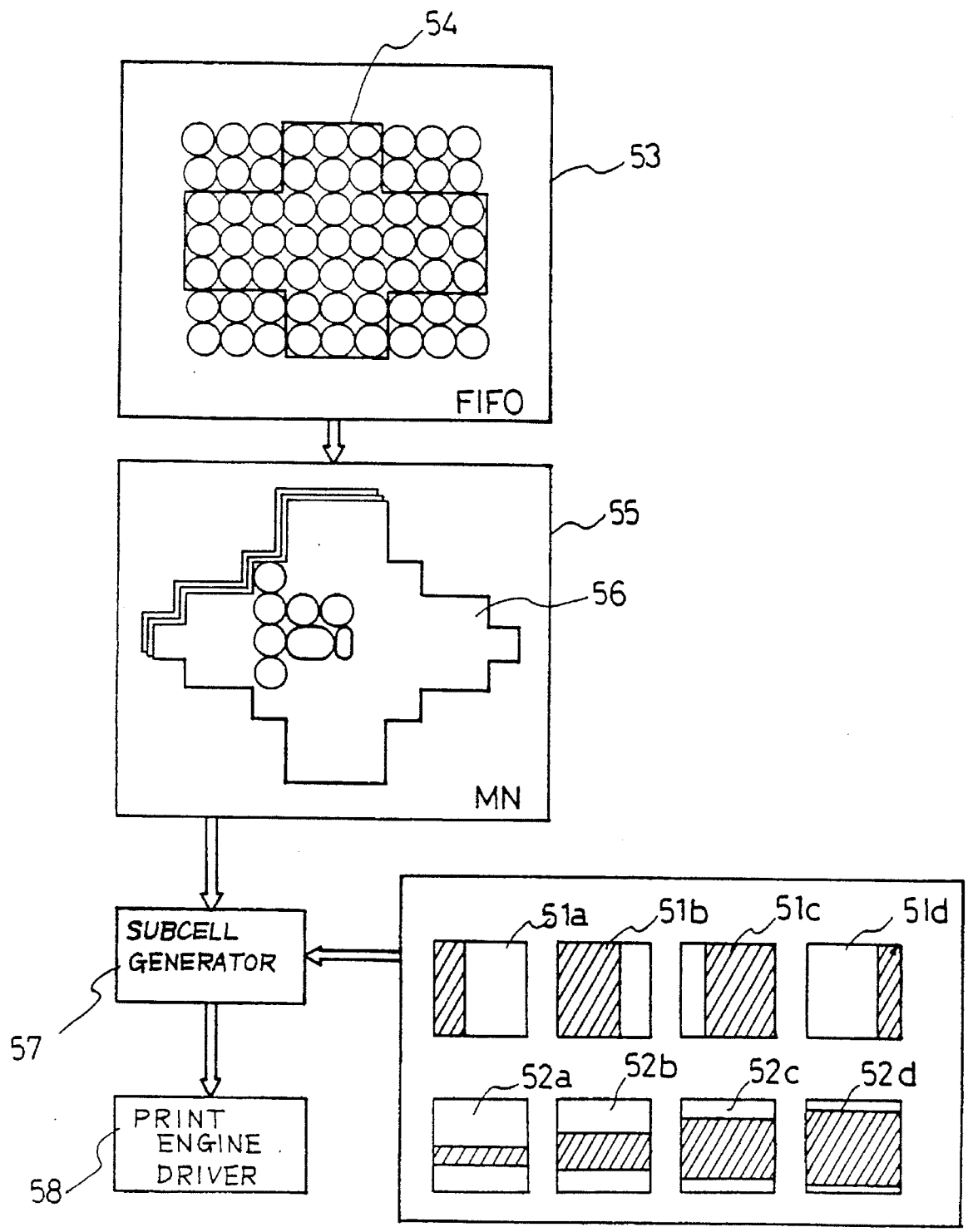
FIG. 10 is an explanatory view showing the smoothing principle of the prior art technique.

The size comparator 115, on the other hand, is so constructed to make comparisons between the identical bit map above with sample patterns (not shown) stored in the comparator 115, on the conditional state where the pixel arrangement in the bit map with the specific pixel at the center does not exceed basically the inclination of 45 degrees, to generate a signal to select 80% or 60% mask pattern for the specific video data for black data, to select 20% or 40% mask pattern for the specific video data for white data, or not to generate the selective signal, as shown in FIG. 8(B), and to transfer the selective signal to the mask signal generator 116, if the selective signal is generated.

The mask signal generator 116, as shown in FIG. 4, includes a divided VDATA generator 121, a mask pattern generator 122, a masking unit 123, and a shift unit 124. The divided VDATA generator 121 generates an original divided video data or a modulated video data identical to the length (12 basic pulses) of VCLK corresponding to the specific pixel. The mask pattern generator 122 selects a mask pattern among 80%, 60%, 40% and 20% patterns, following the selective signal from the size comparator 115. The masking unit 123 generates the first smoothed video data subjecting the original divided video data to Boolean conjunction or AND operation with the selected mask pattern. And the shift unit 124 shifts the divided video data according to the control signal from the position comparator 114.

The detailed constitution of each component of the mask signal generator 116 will be described as follow.

Figure 5A:
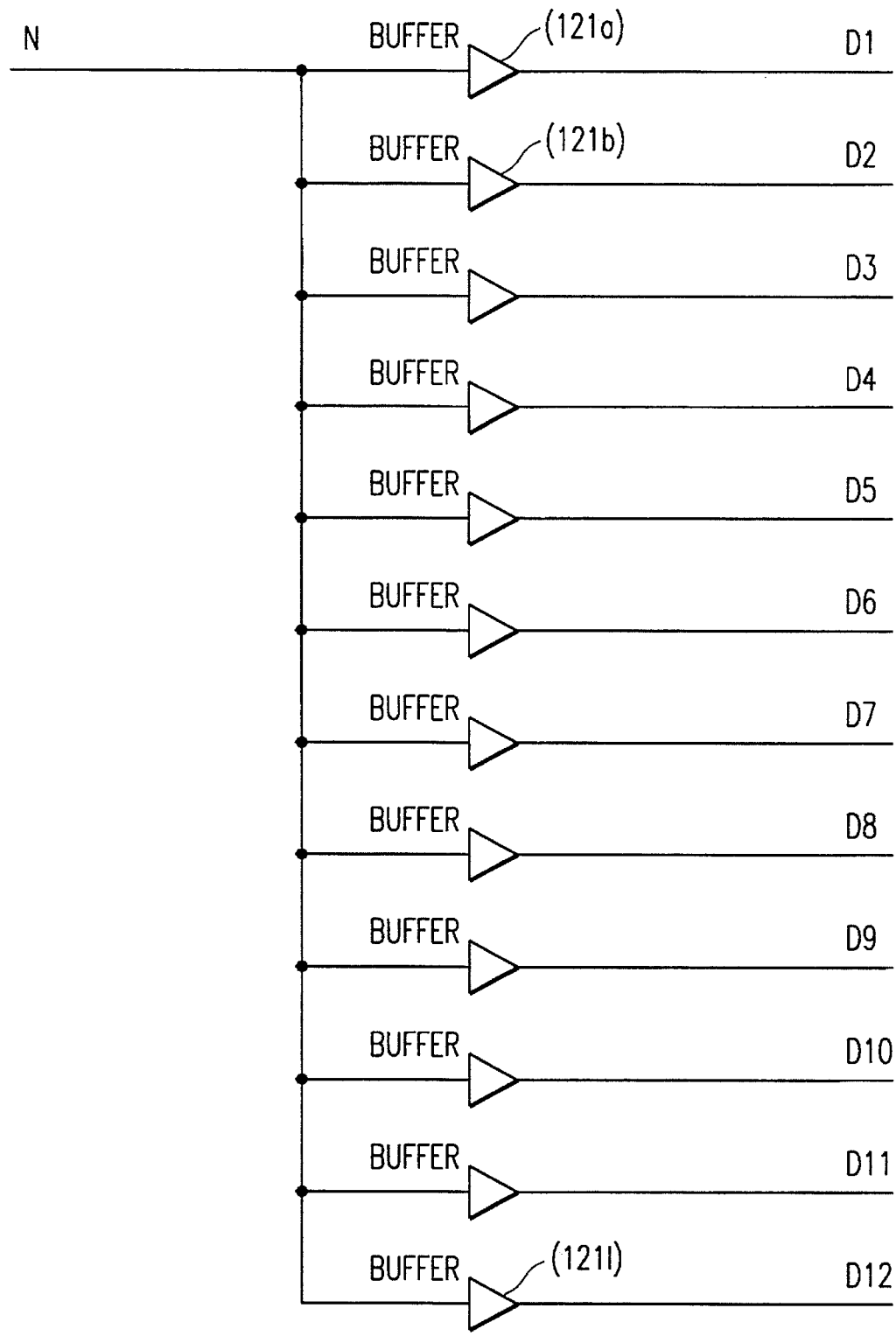

The divided VDATA generator 121, as shown in FIG. 5A, consists of buffers 121a, 121b, . . . , 121l for generating divided VDATA D1, D2, . . . , D12 for a specific pixel passing through the buffers 121a, 121b, . . . , 121l; and then the generator 121 transfers the divided VDATA to a masking unit 123.

Figure 5B:
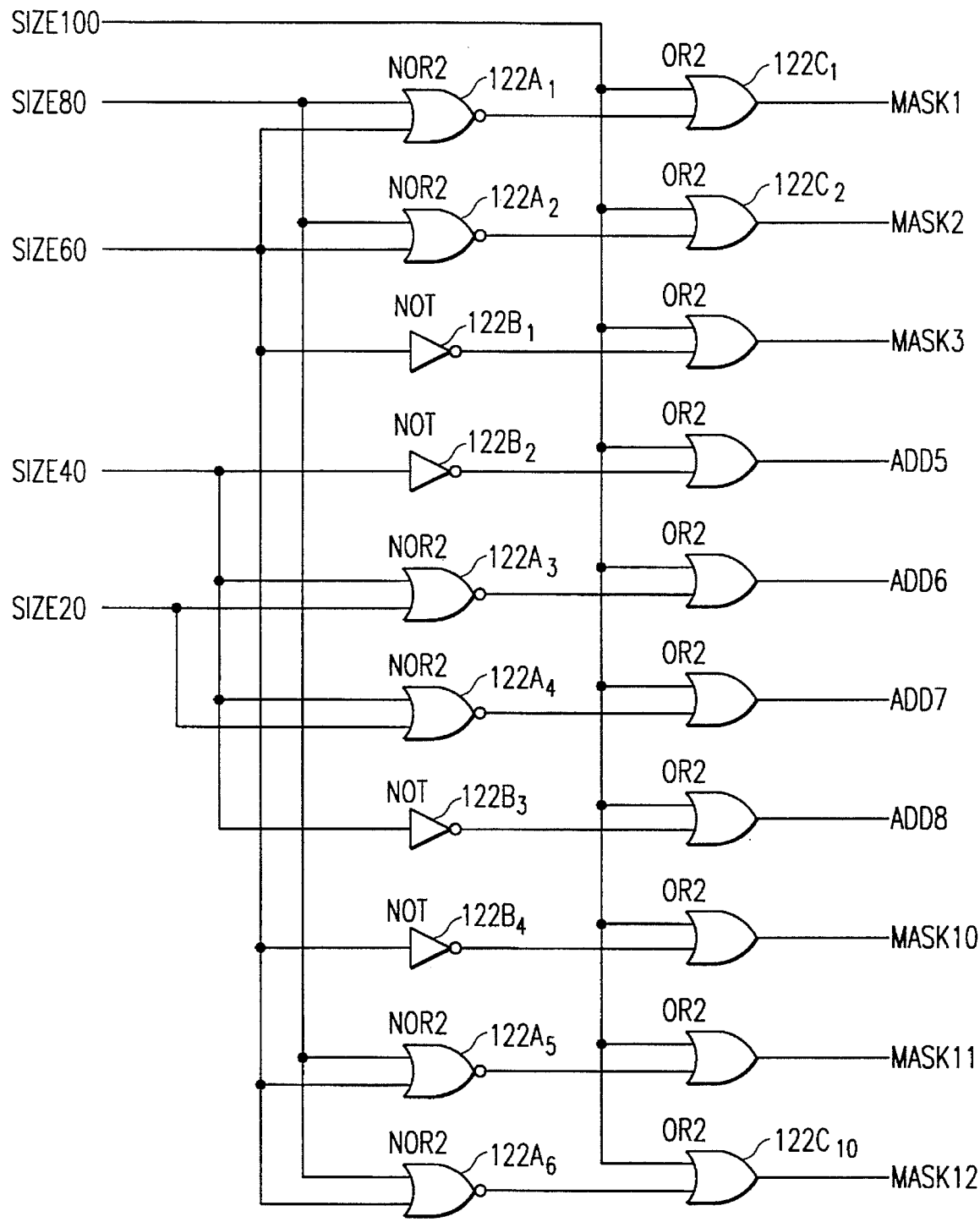

The mask pattern generator 122, as shown in FIG. 5B, includes NOR gates 122A1, 122A2, . . . , 122A6, NOT gates 122B1, 122B2, . . . , 122B4, and OR gates 122C1, 122C2, ..., 122C10, and generates masking signals MASK1, MASK2, . . . , MASK12 to reduce the size of specific pixel following the signals, size 80, size 60 from the size comparator 115, or generates addition signals ADD5, ADD6, ADD7, ADD8 to add the small dot for blank pixel.

Figure 5C:
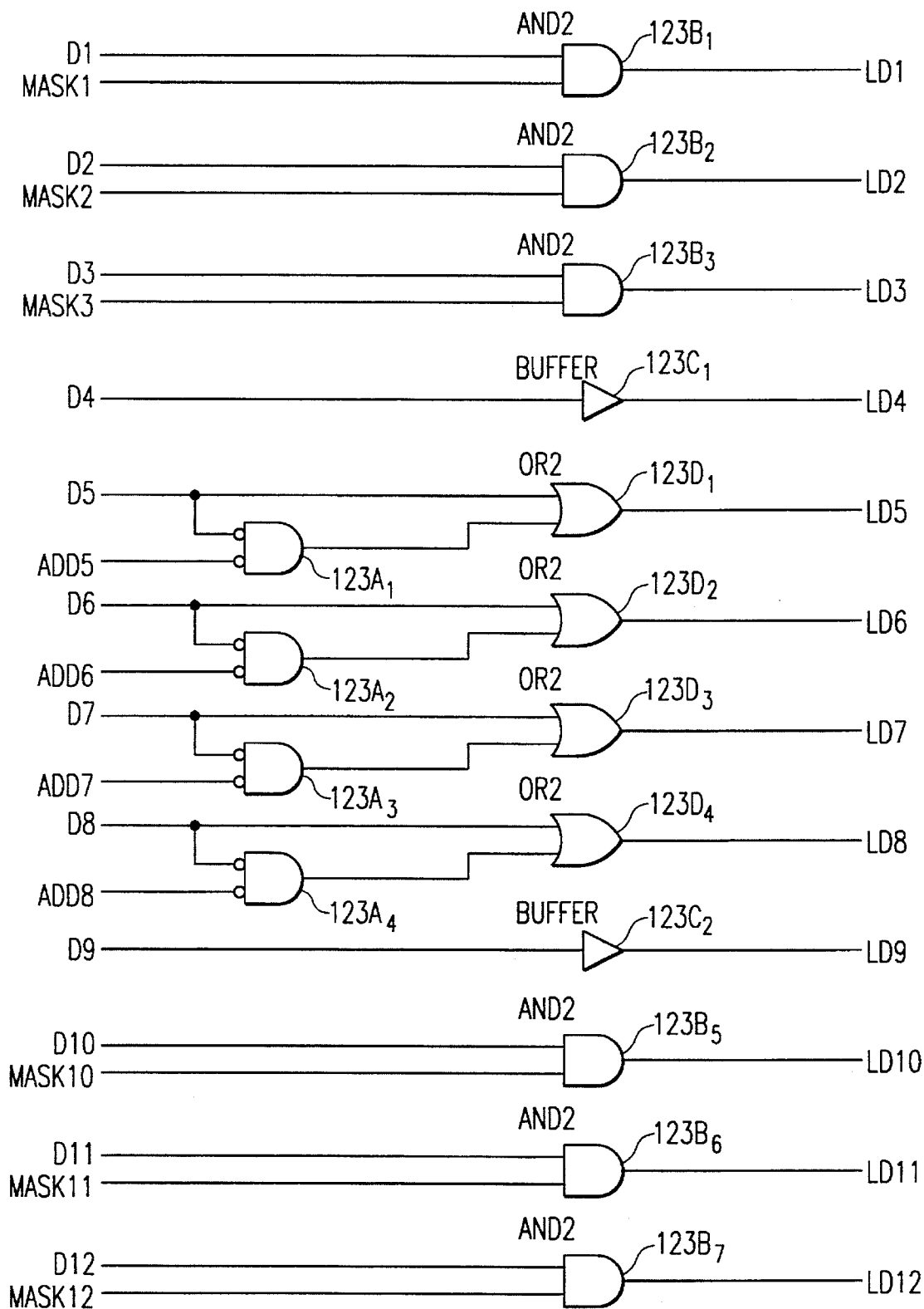

The masking unit 123, as shown in FIG. 5C, includes NOR gate 123A1, 123A2, 123A4, AND gates 123B1, 123B2, . . . , 123B7, buffers 123C1, 123C2, OR gates 123D1, 123D2, . . . , 123D4; and the unit 123 subjects the divided data D1,D2, . . . , D12 from the divided VDATA generator 121 to Boolean operation with the mask signals MASK1, . . . , MASK12, ADD5, . . . , ADD8, to generate masking data LD1, LD2, . . . LD12 of the first and the second smoothed divided video data.

Figure 5D:
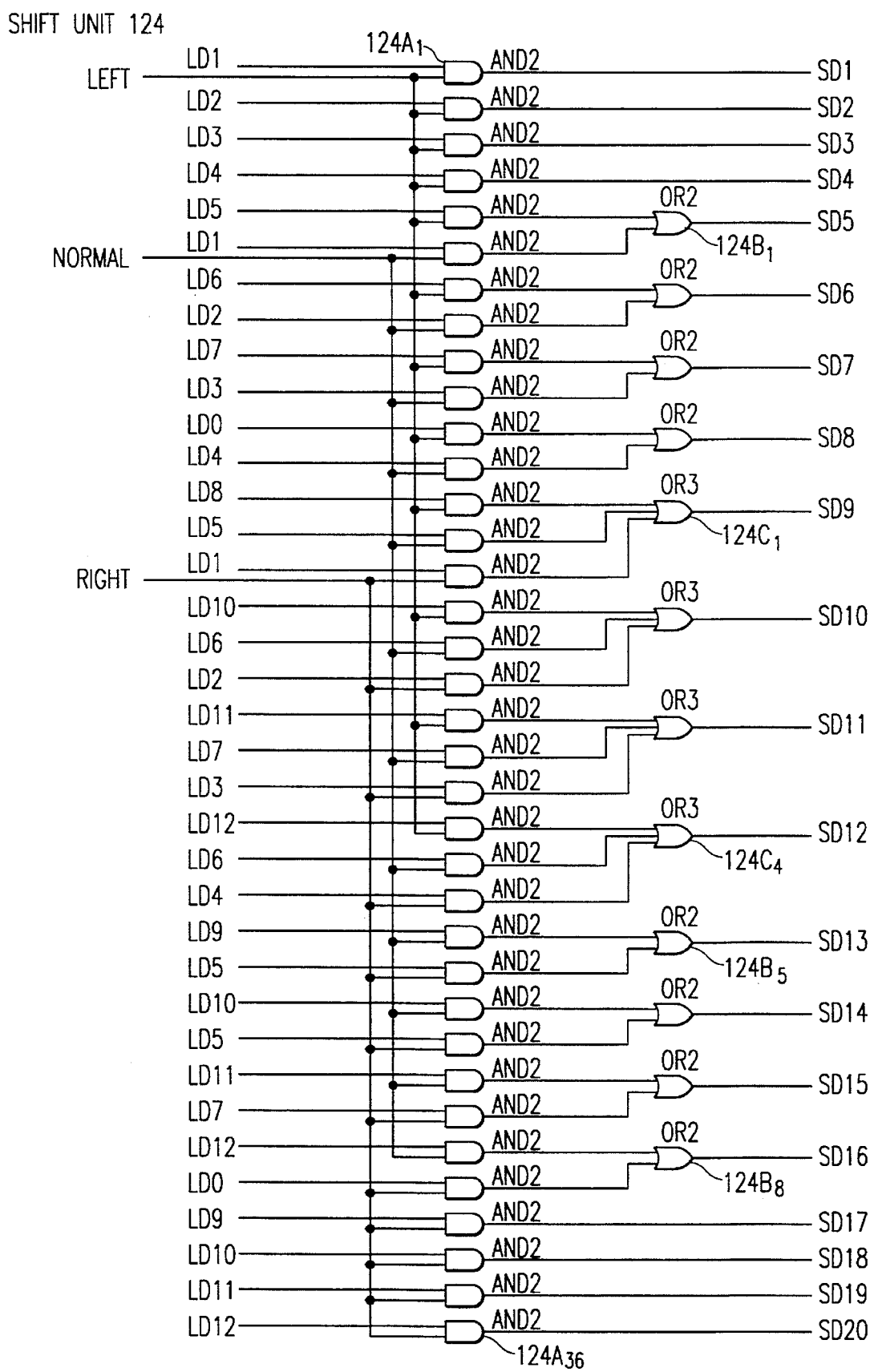

The shift unit 124, as shown in FIG. 5D, includes AND gates 124A1, 124A2, . . . , 124A36, OR gates 124B1, 124B2, . . . , 124B8, 124C1, 124C2, . . . , 124C4; and the unit 124 subjects the divided video data to Boolean operation with the shift signals from the position comparator 114 to define the video data not to be shifted; or to be shifted to the right or left, to realize the signals LD1, LD2, . . . , LD12 to be signals SD1, SD2, . . . , SD12 on the "LEFT" processing, the signals LD1, LD2, . . . , LD12 to be signals SD5, SD6, . . . , SD16 on the "NORMAL" processing, and signals LD1, LD2, . . . , LD12 to be signals SD9, SD10, . . . , SD20 on the "RIGHT" processing.

Figure 2:
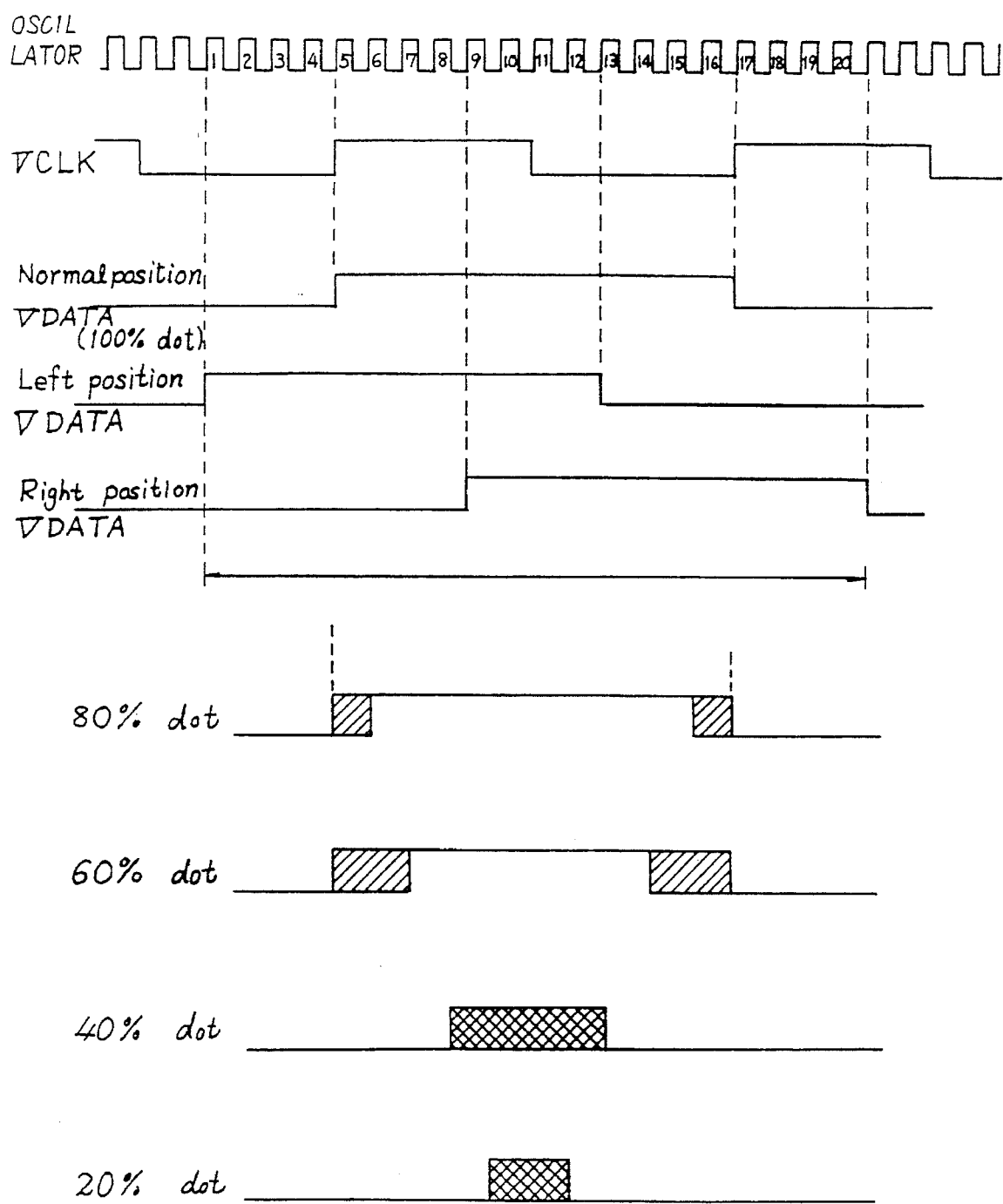
FIG. 2 is a pulse wave chart showing the smoothed video data generated with the masking unit shown in the block diagram.

The operational steps of the present invention will be described referring FIG. 2, the pulse wave chart showing the smoothed video data generated with the masking unit 123.

The length of the original video data or dot size of the pixel is identical to the length of VCLK which is set to 12 basic pulses generated with the oscillator 102 in the embodiment. The pulse data generated with the divided VDATA generator 121 consists of 12 basic pulses of level "1" for a black pixel, or of level "0" for white or blank pixel.

The divided video VDATA are subjected to a Boolean conjunction operation with the mask pattern selected with the mask pattern generator 122 to produce such mask data as follow.

Figure 7A:
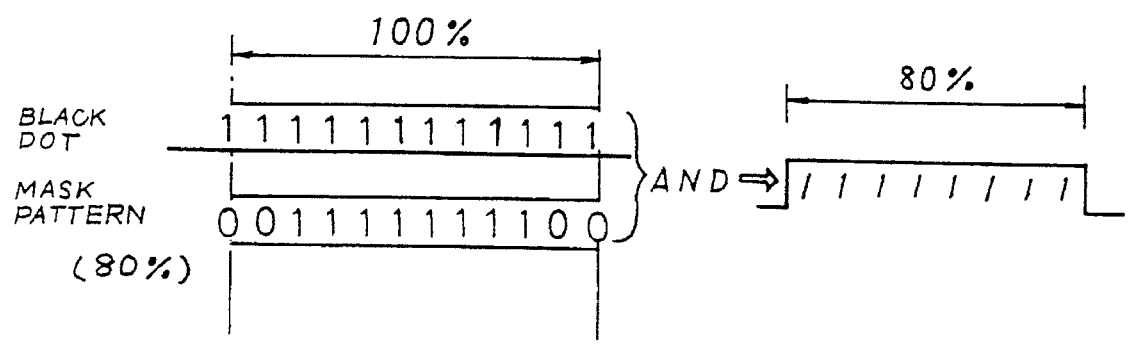
FIG. 7 shows the generating steps of video data operated with the Boolean conjunction with the mask patterns.

That is, as shown in FIG. 7(a), the video data for black pixel is subjected to a conjunction operation with the mask pattern, −80% for example, generated with the generator 122 of which signals MASK1, MASK2, MASK11, MASK12 are "0", or the 60% mask pattern of which signals MASK1, . . . , MASK3, MASK10, . . . , MASK12 are "0", to form the smoothed video data of 80% remaining eight divisional pulses LD3, LD4, LD10 as level "1", or the smoothed data of 60% remaining six divisional pulses LD4, LD5, . . . , LD9 as level "1" respectively.

Figure 7B:
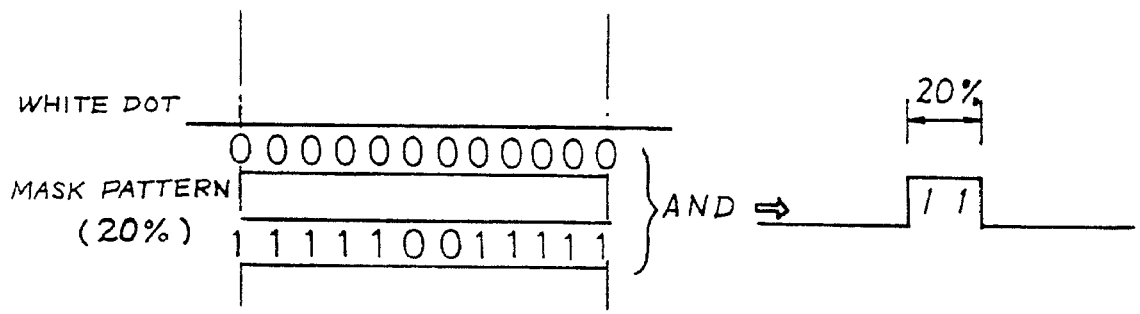

On the other hand as shown in FIG. 7(b), the video data for white pixel of which levels are "0" is subjected to Boolean nondisjunction (NOR) and nonconjunction (NAND) operations, as shown in FIG. 5C, with mask pattern of 40% of which signals ADD5, ADD6, ADD7, ADD8 are "1" to form the smoothed video data of 40% adding four divisional pulses LD5, LD6, LD7, LD8, or with mask pattern of 20% of which signals ADD6, ADD7 are "1" to form the smoothed video data of 20% adding divisional pulses LD6, LD7. In the event that no selecting signal is generated with the size comparator 115, the identical divided video data is passed through the masking unit 123 to be transferred to the shift unit 124.

The divided video data is shifted in 4 basic pulses right or left according to the instruction signal of the position comparator 114 in the shift unit 124 to form the second smoothed video data.

The first or second smoothed divided VDATA, or the original divided VDATA which are subjected to no smoothing operation are transferred into the shift registers 118, 119 one after the other according to the control signals from the shift register control 117 synchronizing with the signals of VCLK.

The shift registers 118, 119 are formed in 20 basic pulses, i.e., 12 basic pulses for the normal VDATA, and each 4 basic pulse for shifting area at the both ends. The divided and smoothed VDATA, i.e., normal position VDATA, shifted VDATA and their masked VDATA, are stored in the registers 118, 119, as shown in FIG. 6A wherein the "NORMAL" row shows a storing state of the normal position VDATA-of the specific pixel N, and in which the "RIGHT" row shows a storing state of the right shifted VDATA of the specific pixel N which is illustrated to overlap on the next pixel (N+1) to rectify the invasion.

The shift registers 118, 119 are so controlled that the divided VDATA stored in the shift registers 118, 119 are transferred to a VDATA output unit 120 one after the other at every transference of VDATA of specific pixel from the 7-lines shift register 113 into the VDATA output unit 120, to be serially transferred further to the print engine 130. In the event that the divided VDATA stored in the registers 118, 119 are the second smoothed VDATA which locate beyond the normal middle area for the 12 basic pulses of pixel size, the smoothed VDATA with a 4 basic pulses extension can not be handled with the 12 basic pulse VCLK. Therefore, the output divided VDATA from the registers 118, 119 are subjected to Boolean disjunction operation with each other in the VDATA output unit 120 with the extension overlapped on the adjoining VDATA or pixel to form continuous VDATA transferable serially in a 12-basic-pulses unit corresponding to the VCLK.

The embodiment of the present invention, therefore, because the smoothing processing is selected among a plurality of means according to the pixel arrangement to adopt the most suitable means for the smoothing processing, results in providing the accurate and easy smoothing processing with simple decision operation.

Further, in the embodiment of the present invention means for shifting the video data, modification of basic pulse numbers, and generating of the video data are adopted, wherein the smoothing processing means suitable for so called single axis timing. Thus, the video data is applicable with a traditional technique for either the laser printer of which beam can be modulated horizontally along the main scanning line, or the LED printer of which beam can be modulated vertically along the subscanning line, offering effects of great utility.

We claim:

1. An image smoothing method, comprising:

providing a video clock defining a first plurality of pulses, generating divided video data, the divided video data comprising a plurality of pulses equal in number to the first plurality of pulses, forming at least one of first smoothed video data and second smoothed video data, the first smoothed video data being formed by shifting the divided video data a second plurality of pulses according to an instruction signal, the second smoothed video data being formed by subjecting the divided video data to a Boolean conjunction operation with a mask pattern, providing a plurality of shift registers, the shift registers comprising a center bit area for normal divided video data, the center bit area having a number of bit storage locations corresponding in number to the first plurality of pulses, and an extended shifting area at each end of the center bit area, the extended shifting area having a number of bit storage locations corresponding in number to not less than the second plurality of pulses, transferring at least one of the first smoothed video data, the second smoothed video data, and the divided video data into the shift registers in synchronization with the video clock, wherein the data transferred into the shift registers includes adjoining smoothed video data in one said extended shifting area of each of the shift registers, transferring the at least one of the first smoothed video data, the second smoothed video data, and the divided video data from the shift registers to a print engine, and subjecting the adjoining smoothed video data to a Boolean disjunction operation with each other during the step of transferring the at least one of the first smoothed video data, the second smoothed video data, and the divided video data to the print engine.

2. The method of claim 1, wherein the step of transferring at least one of the first smoothed video data, the second smoothed video data, and the divided video data from the shift registers to a print engine comprises the step of transferring at least one of the first smoothed video data, the second smoothed video data, and the divided video data from the shift registers to a laser printer.

3. The method of claim 1, wherein the image comprises at least a specific pixel and an adjacent pixel, the specific pixel and the adjacent pixel defining a spaced relationship therebetween, and wherein the step of forming at least one of first smoothed video data and second smoothed video data comprises selecting at least one of shifting the divided video data a second plurality of pulses according to an instruction signal and subjecting the divided video data to a Boolean conjunction operation with a mask pattern in response to the spaced relationship between the specific pixel and the adjacent pixel.

4. The method of claim 1, wherein the step of transferring at least one of the first smoothed video data, the second smoothed video data, and the divided video data from the shift registers to a print engine comprises the step of transferring at least one of the first smoothed video data, the second smoothed video data, and the divided video data from the shift registers to a an LED printer.

5. An image smoothing apparatus, comprising:

a print engine, a video clock for defining a first plurality of pulses, means for generating divided video data, the divided video data comprising a plurality of pulses equal in number to the first plurality of pulses, smoothing means for forming at least one of first smoothed video data and second smoothed video data, the smoothing means comprising means for forming the first smoothed video data by shifting the divided video data a second plurality of pulses according to an instruction signal, and means for forming the second smoothed video data by subjecting the divided video data to a Boolean conjunction operation with a mask pattern, a plurality of shift registers, the shift registers comprising a center bit area for normal divided video data, the center bit area having a number of bit storage locations corresponding in number to the first plurality of pulses, and an extended shifting area at each end of the center bit area, the extended shifting area having a number of bit storage locations corresponding in number to not less than the second plurality of pulses, means for transferring at least one of the first smoothed video data, the second smoothed video data, and the divided video data into the shift registers in synchronization with the video clock, wherein the data transferred into the shift registers includes adjoining smoothed video data in one said extended shifting area of each of the shift registers, means for transferring the at least one of the first smoothed video data, the second smoothed video data, and the divided video data from the shift registers to the print engine, and means for subjecting the adjoining smoothed video data to a Boolean disjunction operation with each other when the at least one of the first smoothed video data, the second smoothed video data, and the divided video data are transferred to the print engine.

6. The apparatus of claim 5, wherein the print engine comprises a laser printer.

7. The apparatus of claim 5, wherein the image comprises at least a specific pixel and an adjacent pixel, the specific pixel and the adjacent pixel defining a spaced relationship therebetween, and wherein the smoothing means comprises means for selecting at least one of the means for forming the first smoothed video data and the means for forming the second smoothed video data in response to the spaced relationship between the specific pixel and the adjacent pixel.

8. The apparatus of claim 5, wherein the print engine comprises an LED printer.

* * * * *